Jan. 14, 1941.　　　　A. B. ALLEN　　　　2,228,335
COMBINATION COOKY CUTTER AND MOLD
Filed Feb. 28, 1940
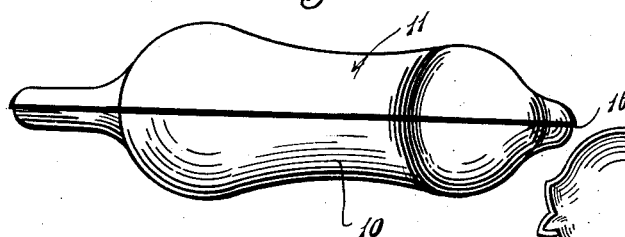
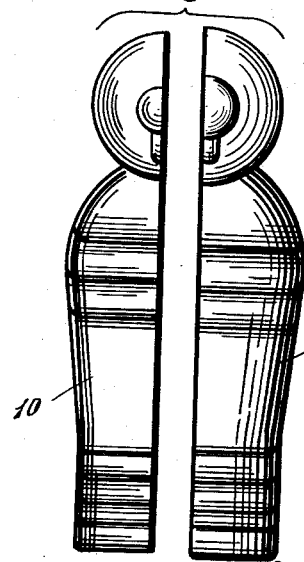
Inventor.
Allie Belle Allen,
By
Attorney.

Patented Jan. 14, 1941

2,228,335

UNITED STATES PATENT OFFICE 2,228,335

COMBINATION COOKY CUTTER AND MOLD

Allie Belle Allen, Tulsa, Okla.

Application February 28, 1940, Serial No. 321,344

2 Claims. (Cl. 107—19)

This invention relates to certain new and useful improvements in a combination cooky cutter and mold.

The primary object of the invention is to provide a combination cooky cutter and mold formed of two similar separably connected sections, each of chambered formation and having an open side with one section slightly larger than the other section whereby the open edges of the mold sections may be overlapped in telescopic assembly relation for use as a mold with the free edges of one of the sections having a sharpened edge to facilitate the use of said section as a cooky cutter, provision being made in the form of a vent opening in the cooky cutter section.

While the design of the combination cooky cutter and mold is shown as an animal for purposes of illustration only, it is to be understood that the same may be of a design or configuration of other animal and plant life of air, land and water, human figures, geometrical designs and the like.

With the above and other objects in view that will become apparent as the nature of the invention is better understood, the same consists in the novel form, combination and arrangement of parts hereinafter more fully described, shown in the accompanying drawing and claimed.

In the drawing:

Figure 1 is a top plan view of a combination cooky cutter and mold with the two sections of the device assembled into mold formation;

Figure 2 is a side elevational view with the two sections assembled into mold formation, the design or configuration being representative of an animal;

Figure 3 is a plan view of the inner side of the cover section of the mold;

Figure 4 is a plan view, partly broken away of the inner side of the cooky cutter section, showing the vent opening therein;

Figure 5 is a horizontal sectional view taken on line 5—5 of Figure 2, showing the sharpened edge of the open side of the cooky cutter section; and Figure 6 shows end elevational views of the two sections relatively positioned for assembly.

The combination cooky cutter and mold disclosed herein may be of any design or configuratin desired and is composed of two chambered sections with the sections relatively proportioned or dimensioned whereby the edges of the open side of one section overlap or telescope over the edges of the open side of the companion section. The section of lesser dimension has the edges of the open side thereof made relatively sharp so that the smaller section may be used as a cooky cutter and said sharpened edge is protected by placement within the edges of the larger cooperating section when the two sections are assembled for use as a mold.

Referring more in detail to the accompanying drawing, the reference characters 10 and 11 designate respectively and in general the two sections of the combination cooky cutter and mold, the section 10 being the cooky cutter for use separately from the section 11, while the section 11 is utilized as a cover in connection with the section 10 when the device is to be used as a mold. It will be seen from an inspection of Figures 1, 2, 5 and 6 that the cover section 11 of the mold is slightly larger than the cooky cutter section 10 to provide for the assembly relationship described.

The cooky cutter section 10 is of changeable formation and has side wall sections 12 bevelled on their inner faces as shown at 13 in Figure 5 to provide a sharpened edge 14 at the open side of the section 10 whereby the latter may be used as a cooky cutter. As shown in Figures 2, 4 and 5 the wall of the cooky cuter section 10 is provided with one or more vent openings 15 to permit the escape of air when the section is used as a cooky cutter.

The section 11 that forms a cover of a mold when such section 11 is assembled with the cooky cutter section 10 has side wall portions 16 that overlap or telescope over the tapered edges 13 of the cooky cutter section 10, as clearly shown in Figure 5.

The vent in the cooky cutter section 10 may be omitted when the mold is to be used to mold liquids, salads, ice cream, candy and statues of plaster or clay.

The molds may be made of paper and used for ice cream, candy and salads for picnics. One end could also be cut to fit around a wooden handle like a "Pop Cicle" stick. The dimensions are to vary from less than one inch for mints to more than six inches or larger depending upon the use of the mold.

From the above detailed description of the invention, it is believed that the construction and use thereof will at once be apparent, and while there is herein shown and described the preferred embodiment of the invention, it is nevertheless to be understood that minor changes may be made therein without departing from the spirit and scope of the invention as claimed.

I claim:

1. In a combination cooky cutter and mold, a pair of chambered sections, each having an open side, said sections being relatively dimensioned whereby the open side of one section telescopes over the open side of the other section, the edge of the open side of the inner section being bevelled and sharpened for use as a cooky cutter, the overlying edge of the outer section protecting the sharpened edge when the sections are assembled.

2. In a combination cooky cutter and mold, a pair of chambered sections, each having an open side, said sections being relatively dimensioned whereby the open side of one section telescopes over the open side of the other section, the edge of the open side of the inner section being bevelled and sharpened for use as a cooky cutter, the overlying edge of the outer section protecting the sharpened edge when the sections are assembled, the section with the sharpened edge having vent openings therein.

ALLIE BELLE ALLEN.